United States Patent
Wang

(10) Patent No.: US 11,130,716 B2
(45) Date of Patent: Sep. 28, 2021

(54) ORGANIC SLOW-ACTING FERTILIZER USING PLANTAGINIS SEMEN HUSK AND MANUFACTURING METHOD THEREFOR

(71) Applicant: Youngsung Wang, Pyeongtaek-si (KR)

(72) Inventor: Youngsung Wang, Pyeongtaek-si (KR)

(*) Notice: Subject to any disclaimer, the term of this patent is extended or adjusted under 35 U.S.C. 154(b) by 134 days.

(21) Appl. No.: 16/491,217

(22) PCT Filed: Mar. 8, 2018

(86) PCT No.: PCT/KR2018/002796
§ 371 (c)(1),
(2) Date: Sep. 5, 2019

(87) PCT Pub. No.: WO2018/169253
PCT Pub. Date: Sep. 20, 2018

(65) Prior Publication Data
US 2020/0024209 A1    Jan. 23, 2020

(30) Foreign Application Priority Data

Mar. 14, 2017  (KR) .................. 10-2017-0032088

(51) Int. Cl.
| | | |
|---|---|---|
| C05F 17/50 | (2020.01) | |
| C05F 1/00 | (2006.01) | |
| C05F 5/00 | (2006.01) | |
| C05G 1/00 | (2006.01) | |
| C05F 17/00 | (2020.01) | |
| C05G 3/00 | (2020.01) | |

(52) U.S. Cl.
CPC ........... *C05F 17/50* (2020.01); *C05F 1/00* (2013.01); *C05F 1/002* (2013.01); *C05F 1/005* (2013.01); *C05F 5/00* (2013.01); *C05F 17/00* (2013.01); *C05G 1/00* (2013.01); *C05G 3/00* (2013.01)

(58) Field of Classification Search
None
See application file for complete search history.

(56) References Cited

FOREIGN PATENT DOCUMENTS

| | | | | |
|---|---|---|---|---|
| CL | 2015003658 A1 | 11/2016 | | |
| CN | 101723748 A | 6/2010 | | |
| CN | 104387164 A | 3/2015 | | |
| CN | 105948913 A | * | 9/2016 | ............ C05D 9/00 |
| CN | 105967850 A | 9/2016 | | |

(Continued)

*Primary Examiner* — Wayne A Langel
(74) *Attorney, Agent, or Firm* — KORUS Patent, LLC; Seong Il Jeong

(57) ABSTRACT

The present invention provides organic slow-acting fertilizer using *psyllium* seed husk and a method for producing the same. Macroelements or secondary elements selected from 12 essential nutrient elements (N, P, K, Ca, Mg, S, Fe, Mn, Cu, B, Mo, and Zn) for edible plants are extracted from each of oil cake (collectively referring to residue remaining after extraction of vegetable oil, and including soybean oil cake, palm oil cake, etc.), blood meal (livestock blood), dead fish or bonefish-containing by-products, bone meal, Dead Sea mineral, egg shell, seashell, oystershell, natural gypsum, dolomite, phyllite, and natural salt, by a predetermined extraction process, and are impregnated in larger amounts into a porous material such as zeolite, and organic fertilizers are produced in the form of *psyllium* seed husk-bound grains for more rapid and effective impregnation so that suitable proportions of element fertilizers can be supplied to each type of plant.

8 Claims, 1 Drawing Sheet

(56) References Cited

FOREIGN PATENT DOCUMENTS

| | | |
|---|---|---|
| CN | 104628467 B | 12/2017 |
| JP | 2000-072578 A | 3/2000 |
| JP | 2005-320181 A | 11/2005 |
| KR | 10-1996-0012295 A | 11/1997 |
| KR | 10-1575549 B1 * | 12/2015 ............... C05F 5/00 |
| KR | 10-2016-0033371 A | 3/2016 |

* cited by examiner

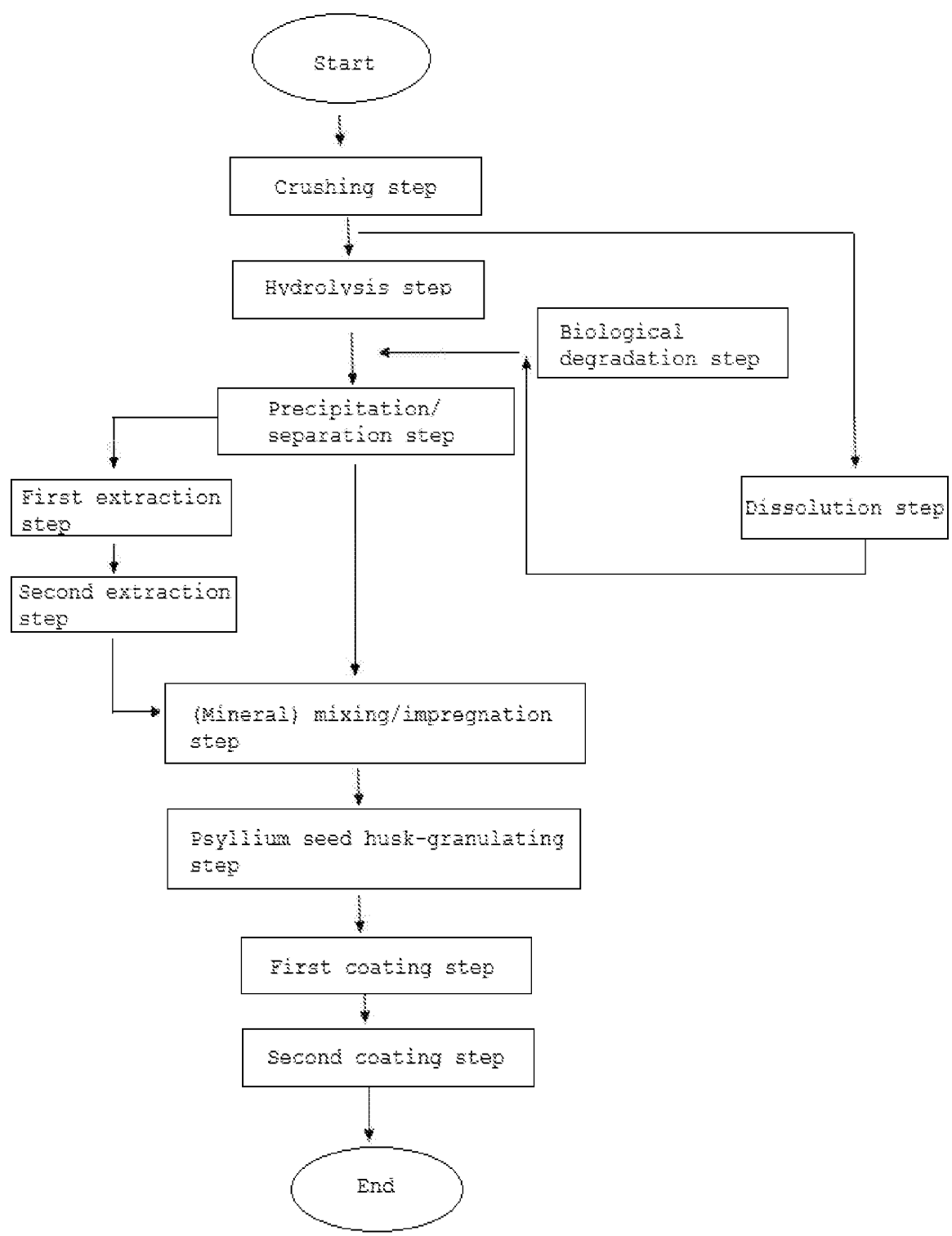

ORGANIC SLOW-ACTING FERTILIZER USING PLANTAGINIS SEMEN HUSK AND MANUFACTURING METHOD THEREFOR

TECHNICAL FIELD

The present invention relates to organic slow-acting fertilizer using *psyllium* seed husk and a method for producing the same, and more particularly to organic slow-acting fertilizer using *psyllium* seed husk and a method for producing the same, in which macroelement, secondary element and mineral fertilizers, each selected from among 12 essential nutrient elements, i.e., N, P, K, Ca, Mg, S, Fe, Mn, Cu, B, Mo, and Zn, required for plant growth, are produced using natural materials.

BACKGROUND ART

In general, fertilizer is intended to supply nutrients to edible plants and ornamental plants, and supplies nutrients to the plants through a nutrient solution obtained by dissolution in water or moisture.

Such fertilizers can be divided into slow-acting fertilizers and chemical fertilizers or organic fertilizers. The chemical fertilizers and the slow-acting fertilizers are composed of chemical substances such as chemical fertilizers, when they are supplied as nutrients to edible plants, problems arise in that they reduce the fertility of soil by solidifying the soil, and cause various adverse effects such as environmental contamination.

In addition, due to the soil contamination, a problem arises in that when humans take the produced edible plants, the contaminants are absorbed into the human body, causing various diseases, such as disharmony of the human body.

In addition, to solve these problems, when the organic fertilizer composts, that is, livestock manure, chicken manure, fish and vegetable fiber such as sawdust, are mixed and added to soil, environmental contamination can be prevented.

However, the nutritional composition of feed and the production environment of compost vary depending on plants or depending on the time, the livestock conditions and the environment in the case of livestock manure, chicken manure, fish by-products and sawdust. Hence, when the nutritional components of the compost are different from nutrients required for each edible plant, problems arise in that good-quality edible plants cannot be produced and edible plants having different qualities depending on cultivators and cultivation regions are produced.

In addition, when the compost contains pathogens, a problem arises in that the compost gives a fatal harmful environment to edible plants.

Furthermore, a problem arises in that since edible plants having different quality depending on cultivation times are produced, safe and high-quality edible plants cannot be evenly provided to consumers, and thus the reliability of the consumer cannot be ensured.

In addition, such conventional compost has problems in that it always produces a lot of bad smell, making the cultivation environment worse, and it is difficult to handle, due to difficulty in its long-term storage and transfer.

In an attempt to solve the above-described problems, the applicant obtained Korean Patent Nos. 10-1682768 and 10-11575549. However, these patents have problems in that the amount of fertilizer impregnated is small, or productivity is low due to long production time, and particularly, fertilizer application should be repeated several times, making the user spend a considerable amount of cost.

In addition, there is a problem in that grains are collapsed due to active microorganisms.

DISCLOSURE

Technical Problem

The present invention has been conceived to overcome the above-described problems, and an object of the present invention is to provide organic slow-acting fertilizer using *psyllium* seed husk and a method for producing the same, in which macroelements or secondary elements selected from 12 essential nutrient elements (N, P, K, Ca, Mg, S, Fe, Mn, Cu, B, Mo, and Zn) for edible plants are extracted from each of oil cake (collectively referring to residue remaining after extraction of vegetable oil, and including soybean oil cake, palm oil cake, etc.), blood meal (livestock blood, that is, seonji), dead fish or bonefish-containing by-products, bone meal, Dead Sea mineral (mineral collected from the Dead Sea; referred to as 'potassium chloride'), egg shell, seashell, oystershell, natural gypsum, dolomite, phyllite, and natural salt, by a predetermined extraction process, and are impregnated in larger amounts into a porous material such as zeolite, and organic fertilizers are produced in the form of *psyllium* seed husk-bound grains for more rapid and effective impregnation so that suitable proportions of element fertilizers can be supplied to each type of plant.

Another object of the present invention is to provide organic slow-acting fertilizer using *psyllium* seed husk and a method for producing the same, in which *psyllium* seed husk grains impregnated with a larger amount of each of macroelement, secondary element and mineral fertilizers are prepared by solidification and coated with a mussel extract mixture, so that these grains can maintain their grain form and also progressively, continuously and sufficiently supply nutrients to plants for a long period of time.

Still another object of the present invention is to provide organic slow-acting fertilizer using *psyllium* seed husk and a method for producing the same, in which organic solid fertilizers are produced by impregnating *psyllium* seed husk-bound grains with the macroelements or secondary elements selected from essential nutrient elements so that they are easy to store for a long period of time and transfer.

Yet another object of the present invention is to provide organic slow-acting fertilizer using *psyllium* seed husk and a method for producing the same, in which the macroelements or secondary elements selected from among essential nutrient elements can be individually produced so that plant-specific nutrients can be sufficiently and continuously supplied to each type of plant.

Technical Solution

In order to accomplish the above objects, the present invention provides a method of producing organic slow-acting fertilizer using *psyllium* seed husk, the method including: a crushing step of drying oil cake corresponding to residue remaining after extraction of vegetable oil, dried fish cake-containing dead fish or blood meal (dry blood), bone meal, potassium chloride, natural gypsum, and dolomite for a predetermined time, and individually crushing the dried materials into powder in a crusher in order to maximize a surface area thereof; a hydrolysis step of placing each of the crushed powders, except for the natural gypsum, dolomite and potassium chloride powders, and a hydrolysis solvent including citric acid or acetic acid and caustic soda, in a plurality of individual mixing containers, closing the mixing containers, and then inducing a hydrolysis reaction at room temperature for a predetermined time, thereby obtaining liquids containing macroelements (including nitrogen, phosphorus and potassium) and liquids containing secondary elements; a precipitation/separation step of removing impurities and hydrolysis residue from the liquids containing macroelements, obtained in the hydrolysis step, by precipitation for a predetermined time, and separating fertilizer-containing liquids; a mixing/impregnation step of adding porous zeolite powder as an artificial substrate, *psyllium* seed husk powder, and the fertilizer-containing liquids to each of the liquids containing macroelements, and impregnating and filling the fertilizer-containing liquids into micropores of the *psyllium* seed husk powder and the zeolite powder by adsorptive power, thereby producing impregnated mixtures; a *psyllium* seed husk grain-forming step of mixing each of the impregnated mixtures with a binder liquid including any one or more of molasses and starch, followed by drying, thereby forming fertilizer-impregnated *psyllium* seed husk-bound grains; a first coating step of coating a first coating member, which is composed of a mixture of linseed oil, any one of clay and silica, and a curing agent, on the outer surface of the *psyllium* seed husk-bound grains famed by the binder; and a second coating step of coating a second coating member, which is composed of a mixture of a mussel extract liquid, any one of clay and silica, and a curing agent, on the outer surface of the *psyllium* seed husk-bound grains resulting from the first coating step.

In this case, the hydrolysis step is replaced by a biological degradation step of placing, in a degradation container, each of oil cake corresponding to residue remaining after extraction of vegetable oil, dried fish cake-containing dead fish or blood meal (dry blood), bone meal, egg shell, seashell, oystershell, and waste fossil, together with a predetermined amount of water, and adding brown rice and humus to the degradation container, and performing degradation by any one of enzymatic degradation and native microbial degradation, thereby obtaining liquids containing macroelements or secondary elements, wherein the oil cake is preferably composed of any one of palm oil cake, soybean oil cake, rapeseed oil cake, cottonseed oil cake, castor oil cake, rice seed oil cake, sesame oil cake, and peanut oil cake; a liquid containing macroelements, obtained from the oil cake, constitutes a fertilizer component including 3 to 15 wt % of nitrogen (N), 2 to 9 wt % of phosphoric acid ($P_2O_5$) and 1 to 3 wt % of potassium or potassium oxide ($K_2O$); a liquid containing macroelements and secondary elements, obtained from the fish cake, constitutes a fertilizer component including 4 to 8 wt % of nitrogen (N), 6 to 9 wt % of phosphoric acid ($P_2O_5$) and 7 to 11 wt % of calcium (CaO); a liquid containing macroelements, obtained from the blood meal and dry blood, constitutes a fertilizer component including 8 to 12 wt % of nitrogen (N), 0.11 wt % of phosphoric acid ($P_2O_5$) and 0.11 wt % of potassium or potassium oxide ($K_2O$); a liquid containing macroelements and secondary elements, obtained from the bone meal, constitutes a fertilizer component including 2 to 4 wt % of nitrogen (N), 18 to 21 wt % of phosphoric acid ($P_2O_5$) and 27 to 30 wt % of calcium (CaO); a liquid containing secondary elements, obtained from the potassium chloride, constitutes a fertilizer component including 60 to 62 wt % of secondary elements; a liquid containing secondary elements, obtained from the dolomite, constitutes a fertilizer component including 20 to 30 wt % of calcium (CaO) and 17 to 21 wt % of magnesium (MgO); a liquid containing secondary elements, obtained from the natural gypsum, constitutes a fertilizer component including 29 to 33 wt % of calcium (CaO) and 15 to 19 wt % of sulfur; and the remainder in each of the liquids is composed of water, impurities, and microelements.

In addition, when natural salt and phyllite and its powder, which are composed of mineral components, are used, the method further includes: a dissolution step of dissolving the natural salt and phyllite and its powder in water by stirring for a predetermined time; a precipitation step of precipitating the solution and separating a mineral liquid therefrom; a mineral impregnation step of adding porous zeolite powder as an artificial substrate, and *psyllium* seed husk powder to the mineral liquid, and impregnating and filling the mineral liquid into micropores of the *psyllium* seed husk powder and the zeolite powder by adsorptive power, thereby producing a mineral-impregnated material; and a *psyllium* seed husk grain-forming step of mixing the mineral-impregnated material with a binder liquid including any one or more of molasses and starch, followed by drying, thereby forming mineral-impregnated *psyllium* seed husk-bound grains, wherein the mineral-impregnated material impregnated with the mineral components is coated in the same manner as the coating steps, and wherein the hydrolysis solvent includes not only a mixture of sulfur, caustic soda (sodium hydroxide) and water mixed at a predetermined ratio, but also one or more of citric acid, acetic acid, carboxylic acid, lactic acid (yogurt), formic acid, citric acid, oxalic acid, succinic acid, tartaric acid and malic acid, which are organic acids that collectively refer to acidic organic compounds.

In addition, the precipitation/separation step further includes: a first extraction step of individually extracting liquids containing each of nitrogen, phosphorus, potassium, calcium, magnesium and sulfur from the fertilizer-containing liquids by gravity separation using water; and a second extraction step of adding any one or more of microorganism and yeast to the residue, subjecting the mixture to fermentative degradation for a predetermined time, thereby producing second fertilizer-containing liquids, concentrating the second fertilizer-containing liquids by heating at high temperature, and then filtering the concentrates through a high-concentration filter, thereby individually extracting liquids respectively containing macroelements and secondary elements, including nitrogen, phosphorus, potassium, calcium, magnesium and sulfur, and the mixing/impregnation step includes: mixing nitrogen liquids extracted in the first and second extraction steps; mixing phosphorus liquids extracted in the first and second extraction steps; mixing potassium liquids extracted in the first and second extraction steps; mixing calcium liquids extracted in the first and second extraction steps; mixing magnesium liquids extracted in the first and second extraction steps; mixing sulfur liquids extracted in the first and second extraction steps; and then individually impregnating each of the nitrogen liquid, phosphorus liquid, potassium liquid, calcium liquid, magnesium liquid and sulfur liquid mixtures into zeolite powder and *psyllium* seed husk powder in respective individual containers.

The present invention also provides inorganic slow-acting fertilizer using *psyllium* seed husk, which are produced by the production method of claims 1 to 4.

Advantageous Effects

According to the present invention, grain type organic fertilizers may be produced by extracting macroelements or secondary elements among 12 essential nutrient elements (N, P, K, Ca, Mg, S, Fe, Mn, Cu, B, Mo, and Zn) for edible plants from each of oil cake (collectively referring to residue remaining after extraction of oil, and including soybean oil cake, palm oil cake, etc.), blood meal (livestock blood, that is, seonji), dead fish or fishbone-containing by-products, bone meal, Dead Sea mineral (mineral collected from the Dead Sea; referred to as potassium chloride), egg shell, seashell, oystershell, natural gypsum, dolomite, phyllite, and natural salt by a predetermined extraction process. The produced organic fertilizers may supply proper proportions of fertilizer elements to each type of plant, thereby being able to produce edible plants of equal quality anywhere regardless of the producer and being able to secure the reliability of the consumer.

Furthermore, according to the present invention, the solidified grain type fertilizer containing desired elements can progressively and continuously supply target nutrients to plants over a long period time, thereby making it possible to safely mass-produce inorganic edible plants through active growth of the edible plants.

Furthermore, according to the present invention, the organic solid fertilizer is produced by impregnating porous grains with each of essential nutrient elements, and thus is easy to store for a long time and transfer. In addition, it can be supplied in exact amounts to each type of plant, thereby enabling target management.

Moreover, according to the present invention, essential nutrient elements can be individually produced, thereby making it possible to grow and manage plants relatively safely from pathogens caused by organic farming.

DESCRIPTION OF DRAWINGS

FIGURE is a flow chart illustrating organic slow-acting fertilizer using *psyllium* seed husk according to the present invention and a method for producing the same.

BEST MODE

Organic slow-acting fertilizer using *psyllium* seed husk according to the present invention and a method for producing the same will be described in detail below with reference to the accompanying drawing.

12 essential nutrient elements according to the present invention are composed of N, P, K, Ca, Mg, S, Fe, Mn, Cu, B, Mo, and Zn. Among them, macroelements are nitrogen, phosphorus and potassium, secondary elements are calcium, magnesium and sulfur, and microelements are the remaining elements. To produce these elements, oil cake (collectively referring to residue remaining after extraction of vegetable oil, and including palm oil cake, soybean oil cake, rapeseed oil cake, cottonseed oil cake, castor oil cake, rice seed oil cake, sesame oil cake, peanut oil cake, etc.), blood meal (livestock blood, that is, seonji, dry blood), dead fish or fishbone-containing by-products, fish cake, bone meal, potassium chloride (collected mineral), egg shell, seashell, oystershell, natural gypsum, dolomite, phyllite, and natural salt are prepared. In this case, the bone meal is animal bone, the potassium chloride is a collected mineral including potassium sulfate, and the seashell and the oystershell cover all types of shells.

Natural fertilizers corresponding to the macroelements, that is, nitrogen, phosphoric acid (corresponding to phosphorus) and potassium, may be extracted from oil cake, blood meal and dead fish, which contain large amounts of these macroelements. Natural fertilizers corresponding to the secondary elements, that is, calcium, magnesium and sulfur, may be extracted from potassium chloride, natural gypsum, dolomite, seashell, and oystershell, which contain large amounts of these secondary elements. Minerals may be extracted from phyllite and natural salt.

FIGURE shows organic slow-acting fertilizer using *psyllium* seed husk according to the present invention and a method for producing the same.

First, regarding extraction of macroelements, oil cake corresponding to any one of palm oil cake, soybean cake, rapeseed oil cake, cottonseed oil cake, castor oil cake, rice seed oil cake, sesame oil cake, and peanut oil cake is prepared, or any one of dead fish, fishbone-containing by-products (including 'fish cake' obtained by drying fish), blood meal (seonji obtained by clotting animal blood), and bone meal is prepared.

Each of oil cake, dead fish, fishbone-containing by-products, blood meal, and bone meal is dried completely, and crushed into powder in a crusher in order to maximize the surface area (a crushing step). At this time, when the bone meal and blood meal are in the form of powder, they are not crushed.

In addition, *psyllium* seed husk is crushed into powder in the same manner as the above-described crushing process. The *psyllium* seed husk powder can be expanded by absorbing water corresponding to at least 40 times its own weight, and thus can be solidified by absorbing an organic natural fertilizer.

In this case, the oil cake collectively refers to residue remaining after extraction of oil. In addition to the above-described crushed material, other natural materials corresponding to animals and plants containing large amounts of macroelements and secondary elements may also be used.

Among these crushed powders, powders of the oil cake, dead fish, fishbone-containing by-product and blood meal are placed in a mixing container. A predetermined proportion of any one of hydrolysis solvents such as citric acid and acetic acid is placed in the mixing container which are then closed, after which a hydrolysis reaction is induced at room temperature (about 25° C.) for a predetermined period of time, thereby obtaining a macroelement-containing liquid containing predetermined proportions of nitrogen, phosphorus (phosphoric acid) and potassium, which are macroelements (a hydrolysis step).

In this case, the hydrolysis solvent is not limited to organic acids, including citric acid and acetic acid, or organic acid complexes, which may be used as organic farming materials, and it also includes a complex of caustic soda and sulfur. In particular, when the hydrolysis solvent includes caustic soda (sodium hydroxide; NaOH), the hydrolysis solvent makes it possible to hydrolyze the powder by adding sulfur and water. That is, it is composed of 25 wt of sulfur, 20 wt % of caustic soda and 55 wt % of water. To induce efficient hydrolysis, the hydrolysis solvent may be neutralized by the addition of 32 wt % of water before use.

In addition, the kind of organic acid collectively refers to acidic organic compounds, including not only citric acid and acetic acid, but also carboxylic acid, lactic acid (yogurt), formic acid, citric acid, oxalic acid, succinic acid, tartaric acid, malic acid, etc.

When the macroelement-containing liquid is obtained from the rapeseed oil cake, it constitutes a fertilizer component including 5.8 wt % of nitrogen (N), 3.1 wt % of phosphoric acid ($P_2O_5$) and 1.5 wt % of potassium or potassium oxide ($K_2O$); when it is obtained from the soybean oil cake, it constitutes a fertilizer component including 7.17 wt % of nitrogen (N), 2 wt % of phosphoric acid ($P_2O_5$) and 2.37 wt % of potassium or potassium oxide ($K_2O$); when it is obtained from the cottonseed oil cake, it constitutes a fertilizer component including 6.6 wt % of nitrogen (N), 2.9 wt % of phosphoric acid ($P_2O_5$) and 1.7 wt % of potassium or potassium oxide ($K_2O$); when it is obtained from the castor oil cake, it constitutes a fertilizer component including 5.7 wt % of nitrogen (N), 2.2 wt % of phosphoric acid ($P_2O_5$) and 1.3 wt % of potassium or potassium oxide ($K_2O$); when it is obtained from the rice seed oil cake, it constitutes a fertilizer component including 3.2 wt % of nitrogen (N), 8.2 wt % of phosphoric acid ($P_2O_5$) and 2.54 wt % of potassium or potassium oxide ($K_2O$); when it is obtained from the sesame oil cake, it constitutes a fertilizer component including 7.26 wt % of nitrogen (N), 2.55 wt % of phosphoric acid ($P_2O_5$) and 1.17 wt % of potassium or potassium oxide ($K_2O$); when it is obtained from the peanut oil cake, it constitutes a fertilizer component including 7.27 wt % of nitrogen (N), 3.2 wt % of phosphoric acid ($P_2O_5$) and 1.3 wt % of potassium or potassium oxide ($K_2O$); and when it is obtained from the palm oil cake, it constitutes a fertilizer component including 3.3 wt % of nitrogen (N), 1.55 wt % of phosphoric acid ($P_2O_5$) and 1 wt % of potassium or potassium oxide ($K_2O$).

In addition, the liquid containing the macroelements and secondary elements, obtained from the fish cake, constitutes a fertilizer component including 4 to 8 wt % of nitrogen, 6 to 9 wt % of phosphoric acid ($P_2O_5$) and 7 to 11 wt % of calcium (CaO), and the liquid containing macroelements, obtained from the blood meal and dry blood, constitutes a fertilizer component including 8 to 12 wt % of nitrogen (N), 0.11 wt % of phosphoric acid ($P_2O_5$) and 0.11 wt % of potassium or potassium oxide ($K_2O$). In this case, the remainder in each of the liquids is composed of water, impurities and microelements.

Each of the macroelement-containing liquids obtained in the hydrolysis step is maintained in the mixing container for a predetermined period of time, and at the same time, residue impurities and hydrolysis residue remaining after the hydrolysis reaction are removed by precipitation, after which only the macroelement-containing liquid is separated (a precipitation/separation step).

The macroelement-containing liquid, separated and extracted in the separation/separation step, is placed in an individual impregnation container so as to be capable of being mixed, and at the same time, relatively highly porous grains such as zeolite together with the *psyllium* seed husk powder are placed in the container and maintained for a predetermined time. Then, the *psyllium* seed husk powder is expanded to at least 40 times by the macroelement-containing liquid, and at the same time, a high concentration of the macroelement-containing liquid is introduced and rapidly and sufficiently impregnated and filled into the pores of the porous grains (an impregnation/mixing step). As a result, an impregnated mixture is produced.

The impregnated mixture is mixed with a binder liquid including any one or more of molasses and starch, and then granulated into grains, and dried at room temperature or a predetermined temperature for a predetermined time, thereby forming fertilizer-impregnated *psyllium* seed husk-bound grains (a *psyllium* seed husk granule-forming step).

The outer surface of the fertilizer-impregnated *psyllium* seed husk-bound grains famed by the binder in the *psyllium* seed husk granule-forming step as described above is coated with a first coating member which is composed of a mixture of linseed oil, any one of clay and silica, and a curing agent (environmentally friendly) (a first coating step).

Then, in order for the *psyllium* seed husk-bound grains to be maintained at a granule state in water for a long time and resist microbial degradation, the outer surface of the *psyllium* seed husk-bound grains resulting from the first coating step is coated with a second coating member which is composed of a mixture of a mussel extract liquid, any one of clay and silica, and a curing agent (environmentally friendly) (a second coating step). In this case, the mussel extract liquid is a mussel protein extract. The mussel protein extract is composed of a thread and a plaque located at the end of the thread. It is a mussel adhesive protein composed of hydrophilic amino acids and showing the best adhesion in a wet environment. In addition to this mussel extract liquid, an adhesive protein extracted from other marine alga, such as kelp, or sea squirt, may also be applied.

Thus, the organic macroelement-impregnated, *psyllium* seed husk-bound grains coated as described above, even when submerged in water, can progressively and continuously supply the mixed fertilizer containing nitrogen, phosphorus and potassium, which are macroelements, to edible plants by the first and second coating members.

Meanwhile, in the crushing step, oil coke corresponding to residue remaining after extraction of vegetable oil, dead fish including dried fish cake, blood meal (or dry blood), bone meal, egg shell, seashell, oystershell, and waste fossil are crushed into powder in a crusher, or are prepared in the form of powder. In addition, a biological degradation step is performed instead of the hydrolysis step. Specifically, oil cake corresponding to residue remaining after extraction of vegetable oil, dried fish cake-containing dead fish or powdered blood (dry blood), bone meal, egg shell, shell, oystershell, and waste fossil, together with a predetermined amount of water, are placed in a degradation container, and brown rice and humus are added to the degradation container at room temperature or higher, and degradation is performed by any one of enzymatic degradation and native microbial degradation, thereby obtaining a liquid phase containing macroelements or secondary elements (a biological degradation step). Next, the precipitation/separation step, the impregnation/mixing step and the first and second coating steps may be sequentially performed, thereby producing slow-acting fertilizers containing macroelements or secondary elements. In this case, a suitable temperature for the microbial degradation is preferably 30° C. or higher, and a suitable temperature for the enzymatic degradation is preferably 40° C. or higher.

As described above, the organic slow-acting fertilizer may be produced by impregnating *psyllium* seed husk-bound grains with secondary elements, including calcium, magnesium and sulfur, and coating the grains.

Specifically, each of bone meal, potassium chloride, egg shell, natural gypsum, seashell, oystershell, dolomite and waste fossil is dried for a predetermined time, and individually crushed into powder in a crusher in order to maximize the surface area thereof (a crushing step). However, potassium chloride, dolomite, natural gypsum, waste fossil, etc. may be distributed in the form of powder and do not need to be powdered separately.

In this case, the liquid containing macroelements and secondary elements, obtained from the bone meal, constitutes a fertilizer component including 2 to 4 wt % of nitrogen (N), 18 to 21 wt % of phosphoric acid ($P_2O_5$), and 27 to 30 wt % of calcium (CaO); the liquid containing secondary elements, obtained from the potassium chloride with a purity of 95% or higher, constitutes a fertilizer component including 60 to 62 wt % of secondary elements; the liquid containing secondary elements, obtained from the dolomite with a purity of 95% or higher, constitutes a fertilizer component including 27 to 30 wt % of calcium (CaO) and 17 to 21 wt % of magnesium (MgO); the liquid containing secondary elements, obtained from the natural gypsum with a purity of 95% or higher, constitutes a fertilizer component including 29 to 33 wt % of calcium (CaO) and 15 to 19 wt % of sulfur; and the remainder in each of the liquids is composed of water, impurities and microelements.

A binder liquid including any one or more of molasses and starch is added to each of the bone meal, egg shell, seashell, potassium chloride, natural gypsum and dolomite powders corresponding to secondary elements, including calcium, magnesium and sulfur, followed by drying for a predetermined time, thereby forming granules (a granule forming step).

Then, the outer surface of the secondary element-containing grains, that is, granulated organic secondary element-containing grains, is coated with a coating member which is composed of a mixture of vegetable oil, including linseed oil, soybean oil and tung oil, any one of clay and talc, and any one selected from diatomite and adsorbent silica powder, and then dried for a predetermined time (a coating step).

Meanwhile, when the above-described granulation is not performed, unlike the hydrolysis step, a liquid containing secondary elements is obtained by precipitation and separation using a water-dissolution technique, and then the liquid containing secondary elements, obtained by precipitation and separation, is placed in an individual impregnation container so as to be capable of being mixed, and at the same time, relatively highly porous grains such as zeolite together with the *psyllium* seed husk powder are placed in the container and maintained for a predetermined time. Then, the *psyllium* seed husk powder is expanded to at least 40 times by the secondary element-containing liquid, and at the same time, a high concentration of the secondary element-containing liquid is introduced and rapidly and sufficiently impregnated and filled into the pores of the porous grains (an impregnation/mixing step). As a result, an impregnated mixture is produced.

The impregnated mixture is mixed with a binder liquid including any one or more of molasses and starch, and then granulated into grains, and dried at room temperature or a predetermined temperature for a predetermined time, thereby forming fertilizer-impregnated *psyllium* seed husk-bound grains (a *psyllium* seed husk granule-forming step).

The outer surface of the fertilizer-impregnated *psyllium* seed husk-bound grains formed by the binder in the *psyllium* seed husk granule-forming step as described above is coated with a first coating member which is composed of a mixture of linseed oil, any one of clay and silica, and a curing agent (environmentally friendly) (a first coating step).

In addition, in order for the *psyllium* seed husk-bound grains to be maintained at a granule state in water for a long time and resist microbial degradation, the outer surface of the *psyllium* seed husk-bound grains resulting from the first coating step is coated with a second coating member which is composed of a mixture of a mussel extract liquid, any one of clay and silica, and a curing agent (environmentally friendly) (a second coating step).

Thus, the *psyllium* seed husk-bound grains coated as described above, even when submerged in water, can progressively and continuously can supply the mixed fertilizer containing nitrogen, phosphorus and potassium, which are macroelements, to edible plants by the first and second coating members.

In addition, regarding the remaining microelements other than nitrogen, phosphorus, potassium, calcium, magnesium and sulfur, when natural salt and phyllite and its powder, which are composed of mineral components, are used, *psyllium* seed-bound, mineral slow-acting fertilizers may be produced by a method including: a dissolution step of dissolving each of the natural salt and phyllite and its powder in water by stirring for a predetermined time; a precipitation step of precipitating the solution and separating a mineral liquid therefrom; a step of adding porous zeolite powder as an artificial substrate, and *psyllium* seed husk powder to the mineral liquid, and impregnating and filling the mineral liquid into micropores of the *psyllium* seed husk powder and the zeolite powder by adsorptive power, thereby producing a mineral-impregnated material; a step of granulating the *psyllium* seed husk; and the same first and second coating steps as described above.

In all the coating steps, mixing may also be performed such that starch and an environmentally friendly curing agent such as powder of any one of clay, white clay and diatomite are coated together on the exposed surface of the *psyllium* seed husk-bound grains impregnated.

Meanwhile, in the production method according to the present invention as described above, the precipitation/separation step may include subdivided extraction steps.

That is, the precipitation/separation step may further include: a first extraction step of individually extracting liquids containing each of nitrogen, phosphorus, potassium, calcium, magnesium and sulfur from the fertilizer-containing liquids by gravity separation using water; and a second extraction step of adding any one or more of microorganism and yeast to the residue, subjecting the mixture to fermentative degradation for a predetermined time, thereby producing second fertilizer-containing liquids, concentrating the second fertilizer-containing liquids by heating at high temperature, and then filtering the concentrates through a high-concentration filter, thereby individually extracting liquids respectively containing macroelements and secondary elements, including nitrogen, phosphorus, potassium, calcium, magnesium and sulfur.

In addition, the mixing/impregnation step according to the subdivided extraction process may include: mixing nitrogen liquids extracted in the first and second extraction steps; mixing phosphorus liquids extracted in the first and second extraction steps; mixing potassium liquids extracted in the first and second extraction steps; mixing calcium liquids extracted in the first and second extraction steps; mixing magnesium liquids extracted in the first and second extraction steps; extracting sulfur liquids extracted in the first and second extraction steps; and then individually impregnating each of the nitrogen liquid, phosphorus liquid, potassium liquid, calcium liquid, magnesium liquid and sulfur liquid mixtures into zeolite powder and *psyllium* seed husk powder in respective individual containers.

Next, granulation and coating processes are performed in the same manner as described above.

The invention claimed is:

1. A method of producing organic slow-acting fertilizer using *psyllium* seed husk, the method comprising:
   a crushing step of drying oil cake corresponding to residue remaining after extraction of vegetable oil, dried fish cake-containing dead fish, blood meal or dry blood, bone meal, potassium chloride, natural gypsum, and dolomite, and individually crushing the dried materials into powder in a crusher in order to maximize a surface area thereof;
   a hydrolysis step of placing each of the crushed powders, except for the natural gypsum, dolomite and potassium chloride powders, and a hydrolysis solvent comprising citric acid or acetic acid and caustic soda, in a plurality of individual mixing containers, closing the mixing containers, and then inducing a hydrolysis reaction at room temperature, thereby obtaining liquids containing macroelements including nitrogen, phosphorus and potassium and liquids containing secondary elements;

a precipitation/separation step of removing impurities and hydrolysis residue from the liquids containing macroelements, obtained in the hydrolysis step, by precipitation, and separating fertilizer-containing liquids;

a mixing/impregnation step of adding porous zeolite powder as an artificial substrate, *psyllium* seed husk powder, and the fertilizer-containing liquids to each of the liquids containing macroelements, and impregnating and filling the fertilizer-containing liquids into micropores of the *psyllium* seed husk powder and the zeolite powder by adsorptive power, thereby producing impregnated mixtures;

a *psyllium* seed husk grain-forming step of mixing each of the impregnated mixtures with a binder liquid comprising any one or more of molasses or starch, followed by drying, thereby forming fertilizer-impregnated *psyllium* seed husk-bound grains;

a first coating step of coating a first coating member, which is composed of a mixture of linseed oil, any one of clay or silica, and a curing agent, on an outer surface of the *psyllium* seed husk-bound grains formed by the binder; and a second coating step of coating a second coating member, which is composed of a mixture of a mussel extract liquid, any one of clay or silica, and a curing agent, on the outer surface of the *psyllium* seed husk-bound grains resulting from the first coating step.

2. The method of claim 1, wherein:

the hydrolysis step is replaced by a biological degradation step of placing, in a degradation container, each of oil cake corresponding to residue remaining after extraction of vegetable oil, dried fish cake-containing dead fish, blood meal or dry blood, bone meal, egg shell, seashell, oystershell, and waste fossil, together with water, and adding brown rice and humus to the degradation container, and performing degradation by any one of enzymatic degradation or native microbial degradation, thereby obtaining liquids containing macroelements or secondary elements;

the oil cake is composed of any one of palm oil cake, soybean oil cake, rapeseed oil cake, cottonseed oil cake, castor oil cake, rice seed oil cake, sesame oil cake, or peanut oil cake; and a liquid containing macroelements, obtained from the oil cake, constitutes a fertilizer component comprising 3 to 15 wt % of nitrogen (N), 2 to 9 wt % of phosphoric acid ($P_2O_5$), and 1 to 3 wt % of potassium or potassium oxide ($K_2O$); a liquid containing macroelements and secondary elements, obtained from the fish cake, constitutes a fertilizer component including 4 to 8 wt % of nitrogen (N), 6 to 9 wt % of phosphoric acid ($P_2O_5$) and 7 to 11 wt % of calcium (CaO); a liquid containing macroelements, obtained from the blood meal and dry blood, constitutes a fertilizer component comprising 8 to 12 wt % of nitrogen (N), 0.11 wt % of phosphoric acid ($P_2O_5$) and 0.11 wt % of potassium or potassium oxide ($K_2O$); a liquid containing macroelements and secondary elements, obtained from the bone meal, constitutes a fertilizer component comprising 2 to 4 wt % of nitrogen (N), 18 to 21 wt % of phosphoric acid ($P_2O_5$) and 27 to 30 wt % of calcium (CaO); a liquid containing secondary elements, obtained from the potassium chloride, constitutes a fertilizer component comprising 60 to 62 wt % of secondary elements; a liquid containing secondary elements, obtained from the dolomite, constitutes a fertilizer component comprising 20 to 30 wt % of calcium (CaO) and 17 to 21 wt % of magnesium (MgO); a liquid containing secondary elements, obtained from the natural gypsum, constitutes a fertilizer component comprising 29 to 33 wt % of calcium (CaO) and 15 to 19 wt % of sulfur; and the remainder in each of the liquids is composed of water, impurities, and microelements.

3. The method of claim 1, when natural salt and phyllite and its powder, which are composed of mineral components, are used, further comprising:

a dissolution step of dissolving the natural salt and phyllite and its powder in water by stirring;

a precipitation step of precipitating the solution and separating a mineral liquid therefrom;

a mineral impregnation step of adding porous zeolite powder as an artificial substrate, and *psyllium* seed husk powder to the mineral liquid, and impregnating and filling the mineral liquid into micropores of the *psyllium* seed husk powder and the zeolite powder by adsorptive power, thereby producing a mineral-impregnated material; and a *psyllium* seed husk grain-forming step of mixing the mineral-impregnated material with a binder liquid comprising any one or more of molasses or starch, followed by drying, thereby forming mineral-impregnated *psyllium* seed husk-bound grains;

wherein the mineral-impregnated material impregnated with the mineral components is coated in the same manner as the coating steps; and wherein the hydrolysis solvent comprises not only a mixture of sulfur, sodium hydroxide) and water, but also one or more of citric acid, acetic acid, carboxylic acid, lactic acid, formic acid, citric acid, oxalic acid, succinic acid, tartaric acid or malic acid, which are organic acids that collectively refer to acidic organic compounds.

4. The method of claim 1, wherein:

the precipitation/separation step further comprises:

a first extraction step of individually extracting liquids containing each of nitrogen, phosphorus, potassium, calcium, magnesium and sulfur from the fertilizer-containing liquids by gravity separation using water; and a second extraction step of adding any one or more of microorganism and yeast to the residue, subjecting the mixture to fermentative degradation, thereby producing second fertilizer-containing liquids, concentrating the second fertilizer-containing liquids by heating at high temperature, and then filtering the concentrates through a high-concentration filter, thereby individually extracting liquids respectively containing macroelements and secondary elements, including nitrogen, phosphorus, potassium, calcium, magnesium and sulfur; and the mixing/impregnation step comprises: mixing nitrogen liquids extracted in the first and second extraction steps; mixing phosphorus liquids extracted in the first and second extraction steps; mixing potassium liquids extracted in the first and second extraction steps; mixing calcium liquids extracted in the first and second extraction steps; mixing magnesium liquids extracted in the first and second extraction steps; mixing sulfur liquids extracted in the first and second extraction steps; and then individually impregnating each of the nitrogen liquid, phosphorus liquid, potassium liquid, calcium liquid, magnesium liquid and sulfur liquid mixtures into zeolite powder and *psyllium* seed husk powder in respective individual containers.

5. Organic slow-acting fertilizer comprising *psyllium* seed husk, which are produced by the production method of claim 1.

6. Organic slow-acting fertilizer comprising *psyllium* seed husk, which are produced by the production method of claim 2.

7. Organic slow-acting fertilizer comprising *psyllium* seed husk, which are produced by the production method of claim 3.

8. Organic slow-acting fertilizer comprising *psyllium* seed husk, which are produced by the production method of claim 4.

* * * * *